UNITED STATES PATENT OFFICE.

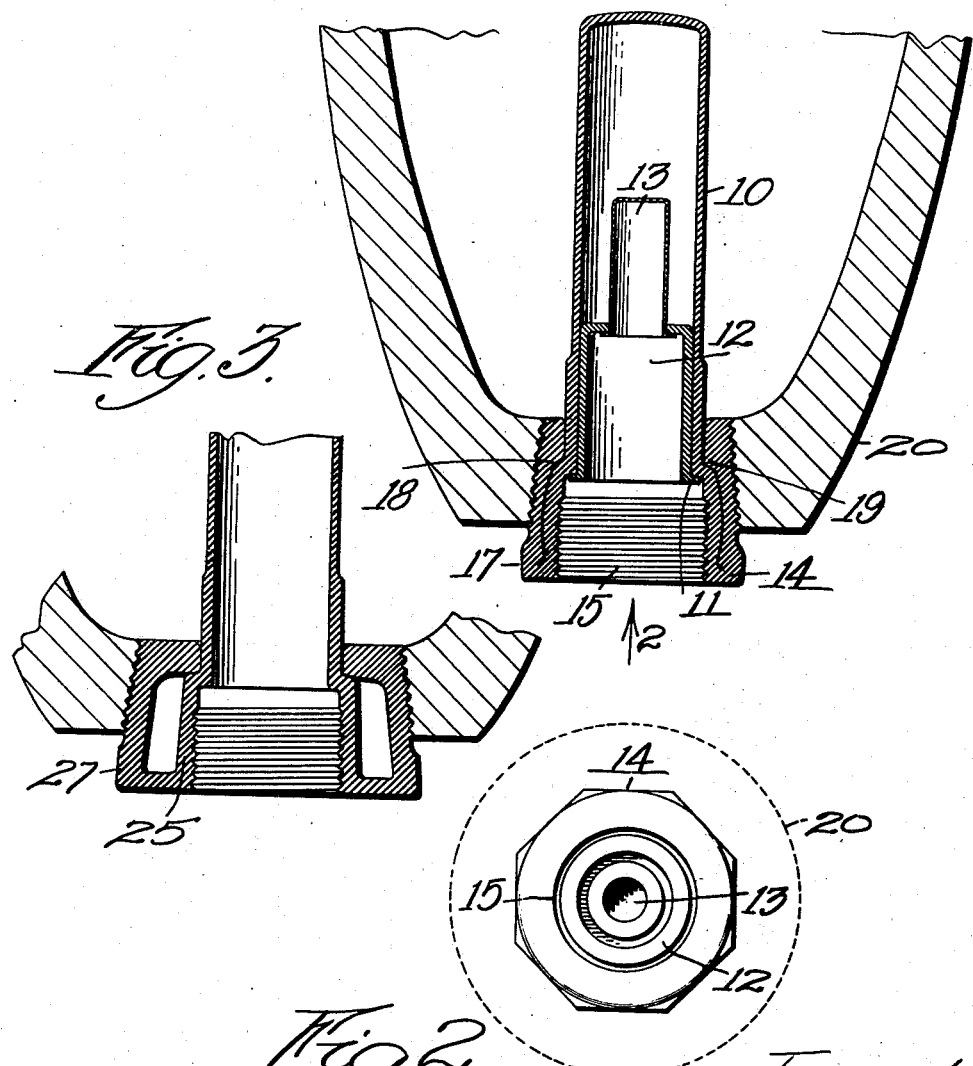

HJALMAR G. CARLSON, OF WORCESTER, MASSACHUSETTS, ASSIGNOR TO GEORGE I. ROCKWOOD, OF WORCESTER, MASSACHUSETTS.

ADAPTER FOR SHELLS.

1,293,701.　　　　Specification of Letters Patent.　　Patented Feb. 11, 1919.

Application filed September 17, 1918. Serial No. 254,480.

*To all whom it may concern:*

Be it known that I, HJALMAR G. CARLSON, a citizen of the United States, residing at Worcester, in the county of Worcester and State of Massachusetts, have invented a new and useful Adapter for Shells, of which the following is a specification.

This invention relates to an adapter for an explosive shell and it involves the adapter itself and the combination with it of the booster casing. These two elements have been made in one piece turned up from solid or bar stock involving an expensive process, and sometimes the two parts have been made separately and connected together, but the connection has always been objectionable for certain reasons, especially the liability of any form of mechanical joint between the adapter and booster casing to leakage of gas if used in a gas shell.

The principal object of this invention is to avoid both difficulties by producing a combined adapter and booster casing from a single piece of cold drawn metal, thus reducing the cost of manufacture and the time involved very materially, and especially to provide an improved form of adapter in which the pipe thread for connecting it with the shell is formed on a rim extending around the adapter and integral with it. An important feature of the invention is the provision of a positive anchorage between the outer rim and the main body of the adapter that greatly strengthens it, and prevents the inner part being blown out of the rim.

Further objects and advantages of the invention will appear hereinafter.

Reference is to be had to the accompanying drawings, in which—

Figure 1 is a central longitudinal sectional view of a portion of a gas shell of small size showing a preferred embodiment of this invention mounted therein;

Fig. 2 is an end view of the adapter, and

Fig. 3 is a view similar to Fig. 1 showing the application of the invention to a larger shell.

In accordance with this invention, the booster casing 10 is made substantially of an ordinary form and need not be described in detail. It has the usual inner shoulder 11 for receiving the flange at the end of the holder 12 for the fuse socket 13.

The adapter 14 is formed of pressed metal in an integral piece with the booster casing and involves a substantially cylindrical main body 15 connected with the booster casing at the shoulder 11 and forming an integral continuation of it. It is screw-threaded inside to receive the member which coöperates with the screw thread and engages the flange of the fuse socket holder to secure it firmly against the shoulder 11.

The main body 15 is slightly thicker than the walls of the booster casing and it is reinforced outside by an external rim 17 integral with it and bent over in the form shown so as to constitute a roughly cylindrical member outside. It is provided with a pipe thread on its outer surface for connecting it with the gas shell 20. It extends preferably beyond the external shoulder 18, and it is in firm contact with the entire exterior surface of the main body 15. The outer end of the adapter is shown as octagonal in form so that it constitutes a nut in the usual way so that a wrench can be applied to it.

An important feature shown in Fig. 1 is the slight thickening of the wall 15 on the outside to make it convex longitudinally or barrel-shaped. As the inner edge of the rim 17 is compressed longitudinally and forced at 19 in over the shoulder 18, its inner wall fits this barrel-shaped surface and anchors the two parts together. Thus, if any weakness develops where the rim is bent over, it is partially compensated for by this construction. The projecting shoulder 19 tends to prevent relative motion of the two parts in one direction and the contacting barrel-shaped surfaces in both. I depend mainly on the shoulder 19 however.

In the form shown in Fig. 3, this latter feature is lost, but all the other advantages are retained. It differs from that shown in Fig. 1 by the separation of the rim 27 from the main body 25, so as to provide a rim large enough for a large size shell. It applies to those shells where a smaller and longer booster casing, relative to the diameter of the adapter, is desired.

In this way it will be seen that a rigid structure is secured in the adapter without reducing its strength both because the long surfaces between the members 15 and 17 are in contact throughout the main portion and because of the bend in shoulder 19; that the cost of production is greatly reduced by providing a device that can be made entirely by a series of cold drawn metal operations; and moreover, that the liability of the booster casing to become separated from the adapter in the two-part forms is absolutely entirely avoided, as is any possibility of gas leakage between the booster casing and adapter.

Although I have illustrated and described only two forms of the invention, I am aware of the fact that other modifications can be made therein by any person skilled in the art without departing from the scope of the invention as expressed in the claims. Therefore I do not wish to be limited in these respects, but what I do claim is:—

1. An adapter for an explosive shell or the like comprising an inner wall and an outer wall integrally connected at the end of the adapter only.

2. An adapter for a shell comprising an inner wall and an outer wall integrally connected at the end of the adapter only, both walls being of substantially cylindrical form and in contact throughout their adjacent surfaces.

3. An adapter for a shell comprising an inner wall and an outer wall integrally connected at the end of the adapter only, and a booster casing constituting an integral continuation of said inner wall.

4. An adapter for a shell comprising a pressed metal inner wall and a pressed metal outer wall integrally connected at the base of the adapter, and anchored together throughout their length.

5. An adapter for a shell comprising a pressed metal inner wall and a pressed metal outer wall integrally connected at the base of the adapter, the outer wall projecting beyond the end of the inner wall and lapping over it.

6. An adapter for a shell comprising a pressed metal inner wall and a pressed metal outer wall integrally connected at the base of the adapter, and a booster casing constituting an integral continuation of said inner wall connected with it by a shoulder, said outer wall projecting inwardly beyond said shoulder.

7. The combination with an adapter for a shell comprising a pressed metal inner body of a general cylindrical form and a rim integrally connected with the outer edge thereof enveloping the inner body, said body having a shoulder at the inner end thereof, of a booster casing of cold drawn sheet metal integral with said shoulder.

8. As an article of manufacture, an adapter for shells comprising a pressed metal inner body of a general cylindrical form, a shoulder at the inner end thereof for connection with the booster casing, and an enveloping rim integrally connected with the outer edge of the inner body and having an inward extension at its inner edge projecting under said shoulder.

9. As an article of manufacture, an adapter for shells comprising a pressed metal inner body of a general cylindrical form, and a rim integrally connected with the outer edge enveloping the main body and extending throughout the length thereof, said rim having a pipe thread on its exterior by which it is adapted to be connected with the shell.

10. As an article of manufacture, an adapter for shells comprising a pressed metal inner body of a general cylindrical form, and a rim integrally connected with the outer edge thereof enveloping the main body, the inner wall having a doubly convex barrel-shaped outer surface, and the outer rim fitting said surface, whereby the rim is anchored to said body.

11. As an article of manufacture, an adapter for shells comprising a body and a rim integrally connected with the outer edge thereof enveloping the main body, said body having a shoulder at the inner end thereof, and said rim having an inward extension at its inner edge projecting over said shoulder substantially into contact with the exterior of said main body to prevent longitudinal separation of the rim.

In testimony whereof I have hereunto affixed my signature.

HJALMAR G. CARLSON.